United States Patent
Rothkopf et al.

(10) Patent No.: US 11,015,960 B2
(45) Date of Patent: *May 25, 2021

(54) OPTICAL ENCODER FOR DETECTING CROWN MOVEMENT

(71) Applicant: Apple Inc., Cupertino, CA (US)

(72) Inventors: Fletcher R. Rothkopf, Los Altos, CA (US); Prashanth S. Holenarsipur, Fremont, CA (US); Colin M. Ely, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/256,990

(22) Filed: Jan. 24, 2019

(65) Prior Publication Data

US 2019/0170541 A1     Jun. 6, 2019

Related U.S. Application Data

(63) Continuation of application No. 14/333,416, filed on Jul. 16, 2014, now Pat. No. 10,190,891.

(51) Int. Cl.
*G01D 5/347*     (2006.01)
*G01P 3/486*     (2006.01)
(Continued)

(52) U.S. Cl.
CPC ....... *G01D 5/3473* (2013.01); *G01D 5/34746* (2013.01); *G01D 5/34792* (2013.01);
(Continued)

(58) Field of Classification Search
CPC ............. G01D 5/3473; G01D 5/34792; G01D 5/34746; G01P 3/50; G01P 3/36; G01P 3/486
See application file for complete search history.

(56) References Cited

U.S. PATENT DOCUMENTS 2,237,860 A    4/1941   Bolle
2,288,215 A    6/1942   Taubert et al.
(Continued)

FOREIGN PATENT DOCUMENTS

CH     1888928     1/1937
CN     1302740     9/2001
(Continued)

OTHER PUBLICATIONS

U.S. Appl. No. 14/333,416, filed Jul. 16, 2014, Rothkopf et al.
(Continued)

*Primary Examiner* — Jennifer D Bennett
(74) *Attorney, Agent, or Firm* — Brownstein Hyatt Farber Schreck, LLP

(57) ABSTRACT

Embodiments of the present disclosure provide an optical encoder for an electronic device. The optical encoder comprises an elongated shaft having an encoding pattern made up of axial markings and radial markings. The encoding pattern may be disposed around a circumference of the elongated shaft. The optical encoder also includes an optical sensor. In embodiments, the optical sensor includes an emitter and a photodiode array. The emitter causes light to shine on the encoding pattern. The encoding pattern reflects
(Continued)

the light back to the photodiode array and the photodiode array determines movement of the shaft based on the reflected light.

20 Claims, 8 Drawing Sheets

(51) Int. Cl.
 *G01P 3/36* (2006.01)
 *G01P 3/50* (2006.01)
(52) U.S. Cl.
 CPC ............... *G01P 3/36* (2013.01); *G01P 3/486* (2013.01); *G01P 3/50* (2013.01)

(56) References Cited

U.S. PATENT DOCUMENTS

| | | | |
|---|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 4,007,347 A | 2/1977 | Haber |
| 4,031,341 A | 6/1977 | Wuthrich et al. |
| 4,037,068 A | 7/1977 | Gaynor |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,593,194 A | 6/1986 | Graham et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano et al. |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Billman |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,998,553 B2 | 2/2006 | Hisamune et al. |
| 7,016,263 B2 | 3/2006 | Gueissaz et al. |
| 7,021,442 B2 | 4/2006 | Borgerson |
| 7,034,237 B2 | 4/2006 | Ferri et al. |
| 7,081,905 B1 | 7/2006 | Raghunath et al. |
| 7,102,626 B2 | 9/2006 | Denny, III |
| 7,111,365 B1 | 9/2006 | Howie, Jr. |
| 7,113,450 B2 | 9/2006 | Plancon et al. |
| 7,119,289 B2 | 10/2006 | Lacroix |
| 7,135,673 B2 | 11/2006 | Saint Clair |
| 7,167,083 B2 | 1/2007 | Giles |
| 7,202,851 B2 | 4/2007 | Cunningham et al. |
| 7,244,927 B2 | 7/2007 | Huynh |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,345,513 B2 | 3/2008 | Gropper et al. |
| 7,358,481 B2 | 4/2008 | Yeoh et al. |
| 7,371,745 B2 | 5/2008 | Ebright et al. |

(56) References Cited

U.S. PATENT DOCUMENTS

| | | |
|---|---|---|
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 7,999,199 B2 | 8/2011 | Villain |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,487,237 B2 | 7/2013 | Watanabe |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,576,171 B2 | 11/2013 | Grant |
| 8,593,598 B2 | 11/2013 | Chen et al. |
| 8,607,662 B2 | 12/2013 | Huang |
| 8,614,881 B2 | 12/2013 | Yoo |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,890,045 B2 | 11/2014 | Toh et al. |
| 8,895,911 B2 | 11/2014 | Takahashi |
| 8,905,631 B2 | 12/2014 | Sakurazawa et al. |
| 8,908,477 B2 | 12/2014 | Peters et al. |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,694 B2 | 3/2015 | Lee et al. |
| 8,994,827 B2 | 3/2015 | Mistry et al. |
| 9,001,625 B2 | 4/2015 | Essery et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,145 B2 | 9/2015 | Shimizu |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,263,204 B2 | 2/2016 | Rivera |
| 9,277,156 B2 | 3/2016 | Bennett et al. |
| 9,285,926 B2 | 3/2016 | Yang et al. |
| 9,350,850 B2 | 5/2016 | Pope et al. |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,552,023 B2 | 1/2017 | Joo et al. |
| 9,599,964 B2 | 3/2017 | Gracia |
| 9,607,505 B2 | 3/2017 | Rothkopf et al. |
| 9,620,312 B2 | 4/2017 | Ely et al. |
| 9,627,163 B2 | 4/2017 | Ely et al. |
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |
| 9,709,956 B1 | 7/2017 | Ely et al. |
| 9,753,436 B2 | 9/2017 | Ely et al. |
| D800,172 S | 10/2017 | Akana |
| 9,797,752 B1 | 10/2017 | Ruh et al. |
| 9,797,753 B1 | 10/2017 | Gowreesunker et al. |
| 9,800,717 B2 | 10/2017 | Ma et al. |
| 9,836,025 B2 | 12/2017 | Ely et al. |
| 9,857,892 B2 | 1/2018 | Armstrong-Muntner |

(56) References Cited

U.S. PATENT DOCUMENTS

| | | |
|---|---|---|
| 9,874,945 B2 | 1/2018 | Fukumoto |
| 9,886,006 B2 | 2/2018 | Ely et al. |
| 9,891,590 B2 | 2/2018 | Shim et al. |
| 9,898,032 B2 | 2/2018 | Hafez et al. |
| 9,927,902 B2 | 3/2018 | Burr et al. |
| 9,939,923 B2 | 4/2018 | Sharma |
| 9,940,013 B2 | 4/2018 | Choi et al. |
| 9,946,297 B2 | 4/2018 | Nazzaro et al. |
| 9,952,558 B2 | 4/2018 | Ely |
| 9,952,682 B2 | 4/2018 | Zhang et al. |
| 9,971,405 B2 | 5/2018 | Holenarsipur et al. |
| 9,977,499 B2 | 5/2018 | Westerman et al. |
| 9,979,426 B2 | 5/2018 | Na et al. |
| 9,993,658 B2 | 6/2018 | Browne et al. |
| 10,001,817 B2 | 6/2018 | Zambetti et al. |
| 10,002,731 B2 | 6/2018 | Wang et al. |
| 10,012,550 B2 | 7/2018 | Yang et al. |
| 10,018,966 B2 | 7/2018 | Ely et al. |
| 10,025,399 B2 | 7/2018 | Kim et al. |
| 10,037,006 B2 | 7/2018 | Ely |
| 10,048,802 B2 | 8/2018 | Shedletsky |
| 10,055,030 B2 | 8/2018 | Stringer et al. |
| 10,061,399 B2 | 8/2018 | Bushnell et al. |
| 10,061,404 B2 | 8/2018 | Chung et al. |
| 10,066,970 B2 | 9/2018 | Gowreesunker et al. |
| 10,092,203 B2 | 10/2018 | Mirov |
| 10,095,394 B2 | 10/2018 | Howard et al. |
| 10,114,342 B2 | 10/2018 | Kim et al. |
| 10,114,450 B2 | 10/2018 | Eguchi |
| 10,145,711 B2 | 12/2018 | Boonsom et al. |
| 10,145,712 B2 | 12/2018 | Ruh et al. |
| 10,176,652 B2 | 1/2019 | Ely et al. |
| 10,187,364 B2 | 1/2019 | Sarkar et al. |
| 10,190,891 B1* | 1/2019 | Rothkopf .............. G01D 5/3473 |
| 10,209,148 B2 | 2/2019 | Lyon et al. |
| 10,216,147 B2 | 2/2019 | Ely et al. |
| 10,222,756 B2 | 3/2019 | Ely et al. |
| 10,222,909 B2 | 3/2019 | Shedletsky et al. |
| 10,234,828 B2 | 3/2019 | Ely et al. |
| 10,290,440 B2 | 5/2019 | Teplitxky et al. |
| 10,296,125 B2 | 5/2019 | Ely et al. |
| 10,331,081 B2 | 6/2019 | Ely et al. |
| 10,331,082 B2 | 6/2019 | Ely et al. |
| 10,353,487 B2 | 7/2019 | Chung et al. |
| 10,379,629 B2 | 8/2019 | Bushnell et al. |
| 10,509,486 B2 | 12/2019 | Bushnell et al. |
| 10,551,798 B1 | 2/2020 | Bushnell et al. |
| 10,572,053 B2 | 2/2020 | Ely et al. |
| 2002/0054060 A1 | 5/2002 | Schena |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0212586 A1* | 10/2004 | Denny, III .............. G06F 1/169 345/156 |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2005/0157971 A1 | 7/2005 | Juijve et al. |
| 2006/0250377 A1 | 11/2006 | Zadesky et al. |
| 2007/0013775 A1 | 1/2007 | Shin |
| 2007/0050054 A1 | 3/2007 | Guruparan et al. |
| 2007/0146348 A1 | 6/2007 | Villain |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0247421 A1 | 10/2007 | Orsley et al. |
| 2009/0051649 A1 | 2/2009 | Rondel |
| 2009/0073119 A1 | 3/2009 | Le et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0250267 A1 | 10/2009 | Heubel et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Havrill |
| 2010/0081375 A1 | 4/2010 | Rosenblatt et al. |
| 2010/0149099 A1 | 6/2010 | Elias |
| 2010/0283731 A1 | 11/2010 | Grant et al. |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie |
| 2014/0045547 A1 | 2/2014 | Singamsetty et al. |
| 2014/0071098 A1 | 3/2014 | You |
| 2014/0073486 A1 | 3/2014 | Ahmed et al. |
| 2014/0132516 A1 | 5/2014 | Tsai et al. |
| 2014/0197936 A1 | 7/2014 | Biggs et al. |
| 2014/0306099 A1* | 10/2014 | Oguchi .............. G01D 5/34707 250/225 |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0320346 A1 | 11/2015 | Chen |
| 2015/0338642 A1 | 11/2015 | Sanford |
| 2015/0366098 A1 | 12/2015 | Lapetina et al. |
| 2016/0018846 A1 | 1/2016 | Zenoff |
| 2016/0045958 A1 | 2/2016 | Korbel |
| 2016/0054813 A1 | 2/2016 | Shediwy et al. |
| 2016/0058375 A1 | 3/2016 | Rothkopf et al. |
| 2016/0116306 A1 | 4/2016 | Ferri et al. |
| 2016/0132116 A1 | 5/2016 | Grant et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0209941 A1 | 7/2016 | Hadas |
| 2016/0241688 A1 | 8/2016 | Vossoughi et al. |
| 2016/0246441 A1 | 8/2016 | Westerman et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2016/0378071 A1 | 12/2016 | Rothkopf et al. |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0069443 A1 | 3/2017 | Wang et al. |
| 2017/0069444 A1 | 3/2017 | Wang et al. |
| 2017/0090599 A1 | 3/2017 | Kuboyama et al. |
| 2017/0104902 A1 | 4/2017 | Kim et al. |
| 2017/0139489 A1 | 5/2017 | Chen et al. |
| 2017/0216519 A1 | 8/2017 | Vouillamoz et al. |
| 2017/0216668 A1 | 8/2017 | Burton et al. |
| 2017/0238138 A1 | 8/2017 | Aminzade |
| 2017/0248446 A1 | 8/2017 | Gowreesunker et al. |
| 2017/0251561 A1 | 8/2017 | Fleck et al. |
| 2017/0285404 A1 | 10/2017 | Kubota et al. |
| 2017/0301314 A1 | 10/2017 | Kim et al. |
| 2017/0331869 A1 | 11/2017 | Bendahan et al. |
| 2017/0351349 A1 | 12/2017 | Fassett et al. |

(56) References Cited

U.S. PATENT DOCUMENTS

| | | |
|---|---|---|
| 2017/0357465 A1 | 12/2017 | Dzeryn et al. |
| 2018/0005496 A1 | 1/2018 | Dogiamis et al. |
| 2018/0031395 A1 | 2/2018 | Ruh et al. |
| 2018/0136686 A1 | 5/2018 | Jackson et al. |
| 2018/0196517 A1 | 7/2018 | Tan et al. |
| 2018/0235491 A1 | 8/2018 | Bayley et al. |
| 2018/0239306 A1 | 8/2018 | Ely |
| 2018/0307361 A1 | 10/2018 | Park et al. |
| 2018/0341342 A1 | 11/2018 | Bushnell et al. |
| 2018/0364815 A1 | 12/2018 | Moussette et al. |
| 2019/0017846 A1 | 1/2019 | Boonsom et al. |
| 2019/0072911 A1 | 3/2019 | Ely et al. |
| 2019/0146415 A1 | 5/2019 | Ely et al. |
| 2019/0163324 A1 | 5/2019 | Shedletsky |
| 2020/0041962 A1 | 2/2020 | Beyhs |
| 2020/0064774 A1 | 2/2020 | Ely et al. |
| 2020/0064779 A1 | 2/2020 | Pandya et al. |
| 2020/0073339 A1 | 3/2020 | Roach et al. |
| 2020/0110473 A1 | 4/2020 | Bushnell et al. |
| 2020/0159172 A1 | 5/2020 | Bushnell et al. |

FOREIGN PATENT DOCUMENTS

| | | |
|---|---|---|
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 201262741 | 6/2009 |
| CN | 101750958 | 6/2010 |
| CN | 201638168 | 11/2010 |
| CN | 101923314 | 12/2010 |
| CN | 102216959 | 10/2011 |
| CN | 202008579 | 10/2011 |
| CN | 102890443 | 1/2013 |
| CN | 202710937 | 1/2013 |
| CN | 103177891 | 6/2013 |
| CN | 1 03191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 104880937 | 9/2015 |
| CN | 204650147 | 9/2015 |
| CN | 105096979 | 11/2015 |
| CN | 105547146 | 5/2016 |
| CN | 105556433 | 5/2016 |
| CN | 105955519 | 9/2016 |
| CN | 205645648 | 10/2016 |
| CN | 205750744 | 11/2016 |
| CN | 106236051 | 12/2016 |
| CN | 206209589 | 5/2017 |
| DE | 3706194 | 9/1988 |
| DE | 102008023651 | 11/2009 |
| DE | 102016215087 | 3/2017 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2720129 | 4/2014 |
| EP | 2884239 | 6/2015 |
| FR | 2030093 | 10/1970 |
| FR | 2801402 | 5/2001 |
| GB | 2433211 | 6/2007 |
| JP | S52151058 | 12/1977 |
| JP | S52164551 | 12/1977 |
| JP | S53093067 | 8/1978 |
| JP | S54087779 | 6/1979 |
| JP | S578582 | 1/1982 |
| JP | S5734457 | 2/1982 |
| JP | S60103937 | 6/1984 |
| JP | S60103936 | 6/1985 |
| JP | H02285214 | 11/1990 |
| JP | H04093719 | 3/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H10161811 | 6/1998 |
| JP | 11121210 | 4/1999 |
| JP | H11191508 | 7/1999 |
| JP | 2000316824 | 11/2000 |
| JP | 2000337892 | 12/2000 |
| JP | 2001084934 | 3/2001 |
| JP | 2001167651 | 6/2001 |
| JP | 2001202178 | 7/2001 |
| JP | 2002165768 | 6/2002 |
| JP | 2003050668 | 2/2003 |
| JP | 2003151410 | 5/2003 |
| JP | 2003331693 | 11/2003 |
| JP | 2004184396 | 7/2004 |
| JP | 2005017011 | 1/2005 |
| JP | 2005063200 | 3/2005 |
| JP | 2005009023 | 4/2005 |
| JP | 2005108630 | 4/2005 |
| JP | 2006164275 | 6/2006 |
| JP | 2007149620 | 6/2007 |
| JP | 2007248176 | 9/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009070657 | 4/2009 |
| JP | 2009519737 | 5/2009 |
| JP | 2010032545 | 2/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2013057516 | 3/2013 |
| JP | 2013079961 | 5/2013 |
| JP | 2013524189 | 6/2013 |
| JP | 2014512556 | 5/2014 |
| JP | 2014174031 | 9/2014 |
| JP | 2018510451 | 4/2018 |
| KR | 20010030477 | 4/2001 |
| KR | 200278568 | 3/2002 |
| KR | 20070011685 | 1/2007 |
| KR | 20070014247 | 2/2007 |
| KR | 100754674 | 9/2007 |
| KR | 20080045397 | 5/2008 |
| KR | 2020100007563 | 7/2010 |
| KR | 20110011393 | 2/2011 |
| KR | 20110012784 | 2/2011 |
| KR | 20110113368 | 10/2011 |
| KR | 20140051391 | 4/2014 |
| KR | 20160017070 | 2/2016 |
| NL | 1040225 | 11/2014 |
| RO | 129033 | 11/2013 |
| TW | 200633681 | 10/2006 |
| WO | WO 01/022038 | 3/2001 |

(56) References Cited

FOREIGN PATENT DOCUMENTS

| WO | WO 01/069567 | 9/2001 |
|---|---|---|
| WO | WO 10/058376 | 5/2010 |
| WO | WO 12/083380 | 6/2012 |
| WO | WO 12/094805 | 7/2012 |
| WO | WO 14/018118 | 1/2014 |
| WO | WO 14/200766 | 12/2014 |
| WO | WO 15/147756 | 10/2015 |
| WO | WO 16/104922 | 6/2016 |
| WO | WO 16/155761 | 10/2016 |
| WO | WO 17/013278 | 1/2017 |

OTHER PUBLICATIONS

U.S. Appl. No. 61/645,033, filed May 9, 2012, 84 pages.
Author Unknown, "Fossil Q ups smartwatch game with handsome design and build," Business Mirror, Makati City, Philippines, 3 pages, Dec. 20, 2016.
Author Unknown, "MyKronoz ZeTime: World's Most Funded Hybrid Smartwatch Raised over $3M on Kickstarter, Running until Apr. 27," Buisness Wire, New York, New York, 3 pages, Apr. 21, 2017.
Author Unknown, "Desirable Android Wear smartwatch from LG," Gulf News, Dubai, 3 pages, Jan. 30, 2015.
Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.
Author Unknown, "mHealth," http://mhealth.vesag.com/?m=201012, 7 pages, Dec. 23, 2010.
Author Unknown, "mHealth Summit 2010," http://www.virtualpressoffice.com/eventsSubmenu.do?page=exhibitorPage&showId=1551&companyId=5394, 5 pages, Nov. 18, 2010.
Author Unknown, "RedEye mini Plug-in Universal Remote Adapter for iPhone, iPod touch and iPad," Amazon.com, 4 pages, date unknown.
Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.
Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.
Author Unknown, "Vyzin Electronics Private Limited launches" Vesag Watch, http://www.virtualpressoffice.com/showJointPage.do?page=jp&showId=1544, 5 pages, Jan. 6, 2011.
Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
DeskThorityNet, Optical Switch Keyboards, http://deskthority.net/keyboards-f2/optical-switch-keyboards-t1474.html, Jul. 11, 2015, 22 pages.
Epstein et al., "Economical, High-Performance Optical Encoders," Hewlett-Packard Journal Oct. 1988, pp. 99-106 [text only version].
Epstein et al., "Economical, High-Performance Optical Encoders," Hewlett-Packard Journal Oct. 1988, pp. 99-106.
GreyB, "Google Watch: Convert your arm into a keyboard," http://www.whatafuture.com/2014/02/28/google-smartwatch/#sthash.Yk35cDXK.dpbs, 3 pages, Feb. 28, 2014.
IBM, "Additional Functionality Added to Cell Phone via "Learning" Function Button," www.ip.com, 2 pages, Feb. 21, 2007.
Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.
Krishnan et al., "A Miniature Surface Mount Reflective Optical Shaft Encoder," Hewlett-Packard Journal, Dec. 1996, Article 8, pp. 1-6.
Rick, "How Vesag Helps Health Conscious Citizens," http://sensetekgroup.com/2010/11/29/wireless-health-monitoring-system/, 2 pages, Nov. 29, 2010.
Sadhu, Rajendra, "How Vesag Helps People Who Want to 'Be There'?," http://ezinearticles.com/?How-Vesag-Helps-People-Who-Want-to-Be-There?&id=5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.

* cited by examiner

OPTICAL ENCODER FOR DETECTING CROWN MOVEMENT

CROSS-REFERENCE TO RELATED APPLICATION

This application is a continuation of U.S. patent application Ser. No. 14/333,416, filed Jul. 16, 2014, and entitled "Optical Encoder for Detecting Rotational and Axial Movement," the contents of which are incorporated herein by reference as if fully disclosed herein.

TECHNICAL FIELD

The present disclosure is directed to optical encoders for electronic devices. Specifically, the present disclosure is directed to an optical encoder in which markings of an encoding pattern of the optical encoder has both an axial component and a radial component disposed around a circumference of the shaft of the optical encoder. In addition, a light source and a photodiode array are aligned in various patterns with respect to the optical encoder so as to detect the rotational and linear movement of the shaft of the optical encoder.

BACKGROUND

Many devices, including mechanical, electronic and computerized devices, may utilize various types of encoders for obtaining and collecting data about the particular device. For example, a rotary encoder may be used to collect information about a position of a component in the device, a direction in which the component is moving, and/or as a speed of the movement of the component. However, some of these encoders are not suitable for use in a small or compact space that may be required for an electronic device having a small form factor.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide an optical encoder for an electronic device. The optical encoder comprises an elongated shaft having an encoding pattern that includes an axial component and a radial component. The axial component and the radial component may consist of a plurality of stripes or markings that are disposed around a circumference of the elongated shaft. The optical encoder also includes an optical sensor. In embodiments, the optical sensor includes an emitter and a photodiode array. The emitter is configured to emit light that is reflected off of the encoding pattern and received by the photodiode array.

In another embodiment, an electronic device is provided. The electronic device includes a processor, a memory and an optical encoder. The optical encoder includes an elongated shaft having an encoding pattern. The encoding pattern includes an axial component and a radial component made up of a plurality of markings that are arranged around a circumference of the elongated shaft.

In yet another embodiment of the present disclosure, a method for detecting movement of a shaft contained within a housing of an electronic device is disclosed. The method includes causing a light source to emanate light on the shaft. The shaft includes an encoding pattern that has an axial component and a radial component disposed around a circumference of the shaft. The encoding pattern reflects the light into a photodiode array. When the reflected light is received by the photodiode array, rotational and linear movement of the shaft may be determined.

DETAILED DESCRIPTION

Figure 1A:
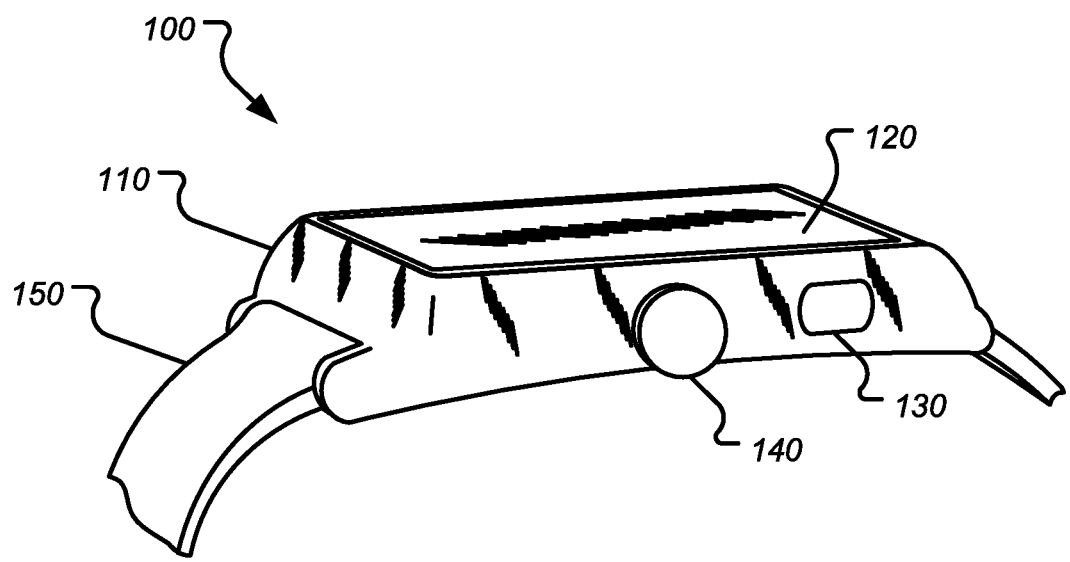
FIG. 1A illustrates an exemplary electronic device according to one or more embodiments of the present disclosure.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

In some electronic devices, one or more components of the electronic device may be configured to move in a variety of directions. Further, each direction in the variety of directions may have a specific purpose or cause a specific outcome. For example, a crown of a time keeping device may be configured to rotate clockwise and counter-clockwise manner in order to move hands or dials that are displayed or otherwise present on a face of the time keeping device. In addition, the crown may also be configured to move linearly from a first position to a second position. For example, the crown may be pressed inward or pulled outward to accomplish a specified task or perform a particular function.

In the examples described above a single optical encoder may be used to detect both the rotational movement of the crown as well as linear movement of the crown. More specifically, embodiments of the present disclosure describe an optical encoder that detects rotational movement, rotational direction and/or rotational speed of a component of the electronic device as well as linear movement and speed of the component of the electronic device. Once the movement has been determined, this information may be used to output or change information and images that are presented on a display or user interface of the electronic device.

As will be explained below, the optical encoder of the present disclosure includes a light source, a photodiode array, and a shaft. However, unlike typical optical encoders, the optical encoder of the present disclosure utilizes an encoding pattern disposed directly on the shaft. For example, the encoding pattern includes a number of light and dark markings or stripes that are axially disposed and radially disposed along the shaft. Each stripe or combination of stripes on the shaft may be used to identify a position of the shaft.

For example, as light is emitted from the light source and reflected off of the shaft into the photodiode array, a position, rotation, rotation direction and rotation speed of movement of the shaft may be determined. Once the rotation direction and speed are determined, output, images and other information that are presented on the display or user interface of the electronic device may be updated.

In other embodiments, the shape or form of the shaft of the encoder may be used to determine a position linear movement and direction, linear speed, rotational movement, rotational direction rotation speed of the shaft. For example, the shaft may be fluted or have a number of channels that cause the light to be reflected in a number of different directions. Accordingly, a diffractive pattern may be used to determine each of the movements described above.

FIG. 1A illustrates an exemplary electronic device 100 according to one or more embodiments of the present disclosure. In certain embodiments, the electronic device 100 may be a portable computing device. Such examples include cell phones, smart phones, tablet computers, laptop computers, time-keeping devices, computerized glasses and other wearable devices navigation devices, sports devices, accessory devices, health-monitoring devices, medical devices and the like. In one example, and as shown in FIG. 1, the electronic device 100 may be a wearable electronic device. The electronic device 100 may include a housing 110 as well as a display 120, a button 130 (or other input mechanism) and a crown 140.

In many examples, the wearable device, such as is depicted in FIG. 1A, may include a processor coupled with or in communication with a memory, one or more communication interfaces, output devices such as displays and speakers, and one or more additional input devices such as buttons, dials, microphones, or touch-based interfaces. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable electronic device 100 may provide information regarding time, health, statuses or externally connected or communicating devices and/or software executing on such devices, messages, video, operating commands, and so forth (and may receive any of the foregoing from an external device), in addition to communications.

In embodiments, the display 120 of the electronic device 100 may be a touch-sensitive display having an input area. The input area may cover the entire display 120 or substantially all of the display 120. In another embodiment, the input area may cover only a portion of the display 120.

The display 120 is configured to output a user interface that displays information about the electronic device 100 as well as other information that is stored in a memory of the electronic device 100. For example, the user interface may present information corresponding to one or more applications that are being executed on the electronic device 100. Such applications may include a time keeping application, an email application, a phone application, a calendaring application, a game application and the like.

In embodiments, the button 130 or the crown 140 may be used to select, adjust or change various images that are output on the display 120. For example, if the display 120 of the electronic device 100 is displaying a time keeping application, the crown 140 may be rotated in either direction to change or adjust the position of the hands or the digits that are displayed for the time keeping application. In other embodiments, the crown 140 may be rotated to move a cursor or other type of selection mechanism from a first displayed location to a second displayed location in order to select an icon or move the selection mechanism between various icons that are output on the display 120 Likewise, the crown may be pulled, pushed or pressed to provide another input to the device 100.

Although not shown in FIG. 1A, the electronic device 100 may also include various additional components that assist in the overall operation of the device. For example, the electronic device 100 may include a sensor, a microphone, a processor, a memory, and the like. Further, the crown 140 and the button 130 may interact with one or more of the components listed to facilitate operation of the electronic device 100.

The electronic device 100 may also include a band 150 that may be used to secure or attach the electronic device 100 to a user. Other attachment mechanisms, such as, for example, a strap, a lanyard or other such attachment mechanism may also be used.

In certain embodiments, electronic device 100 may also include a keyboard or other input mechanism. Additionally, the electronic device 100 may include one or more components that enable the electronic device 100 to connect to the Internet and/or access one or more remote databases or storage devices. The electronic device 100 may also enable communication over wireless media such as acoustic, radio frequency (RF), infrared, and other wireless media mediums. Such communication channels may enable the electronic device 100 to remotely connect and communicate with one or more additional devices such as, for example, a laptop computer, tablet computer, mobile telephone, personal digital assistant, portable music player, speakers and/or headphones and the like.

Figure 1B:
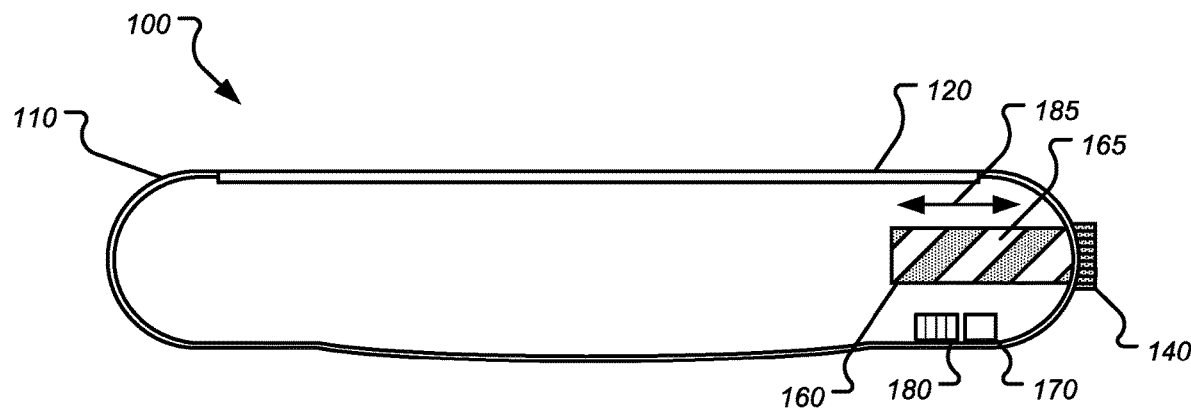
FIG. 1B illustrates a cross-sectional view of the electronic device of FIG. 1A according to one or more embodiments of the present disclosure.
Figure 1C:
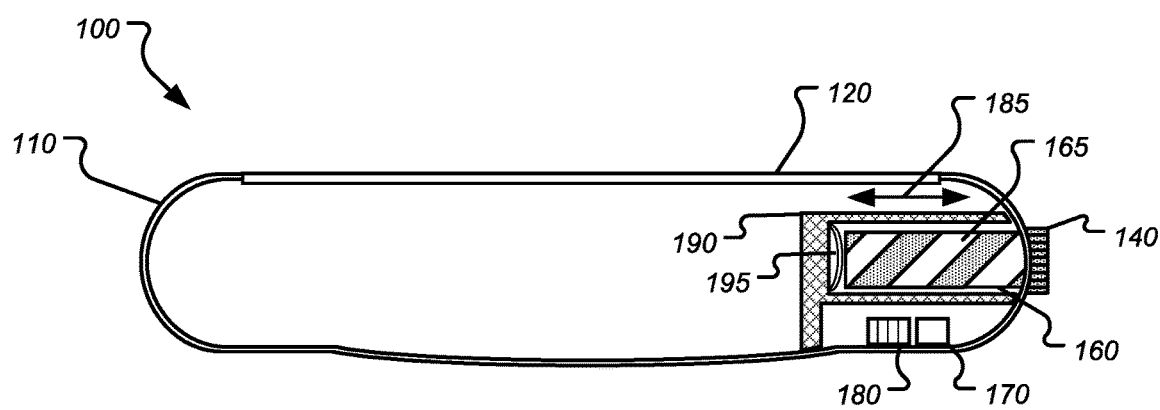
FIG. 1C illustrates a cross-sectional view of the electronic device of FIG. 1A according to an alternate embodiment of the present disclosure

FIG. 1B and FIG. 1C illustrate cross-sectional views of the electronic device 100 of FIG. 1A according to one or more embodiments of the present disclosure. Referring to FIG. 1B, the electronic device 100 includes an optical encoder that consists of a shaft 160, a light source 170 and a photodiode array 180. Although a photodiode array is specifically mentioned, embodiments disclosed herein may use various types of sensors that are arranged in various configurations for detecting the movement described herein. For example, the movement of the shaft 160 may be detected by an image sensor, a light sensor such as a CMOS light sensor or imager, a photovoltaic cell or system, photo resistive component, a laser scanner and the like.

The optical encoder is used to determine positional data of the crown 140. More specifically, the optical encoder may be used to detect rotational and translational movement of the crown 140 including the direction of each of the movements, the speed of each of the movements and so on. The movement may be rotational movement, translational movement, angular movement, and various combinations. The optical encoder may also be used to detect the degree of the change of rotation of the crown 140 and/or the angle of rotation of the crown 140 as well as the speed and the direction of the rotation of the crown 140. Once the movement data of the crown 140 is determined, one or more graphics, images or icons on the display 120 of the electronic device 100 may be updated or altered accordingly.

For example, and continuing with the time keeping application example discussed above, the crown 140 may be rotated in a clockwise manner in order to change the displayed time. The optical encoder of the present disclosure will detect the original starting position of the crown 140, the rotational movement of the crown 140 in the clockwise direction, and will also detect the speed at which the crown 140 is being rotated. As a result, the displayed hands of the time keeping application may rotate or otherwise move in a similar direction and speed.

In another example, the crown 140 of the electronic device may be actuated in a translational manner such as shown by arrow 185. For example, the crown 140 may be pressed inward toward the housing 110 to select a displayed option. In another example, the crown 140 may be pulled outward to perform a particular function. In still yet another example, the crown may be actuated in a translational manner and in a rotational manner simultaneously or substantially simultaneously. Regardless of the movement, the optical encoder disclosed herein may detect the movement and output or change displayed data accordingly.

Referring back to FIG. 1B, the optical encoder may include a shaft 160. The shaft 160 may be coupled to the crown 140. In another embodiment the shaft 160 may be an extension of the crown 140. That is, the crown 140 and the shaft 160 may be manufactured from a single piece. As the shaft 160 is coupled to, or is otherwise a part of the crown 140, as the crown 140 rotates or moves in a particular direction and at a particular speed, the shaft 160 also rotates or moves in the same direction and with the same speed.

The shaft 160 of the optical encoder includes an encoding pattern 165. As discussed, the encoding pattern 165 is used to determine positional information about the shaft 160 including translational movement, rotational movement, angular displacement as well as movement speed. The encoding pattern 165 may include a plurality of light and dark stripes such as shown in FIG. 1B.

Figure 2A:
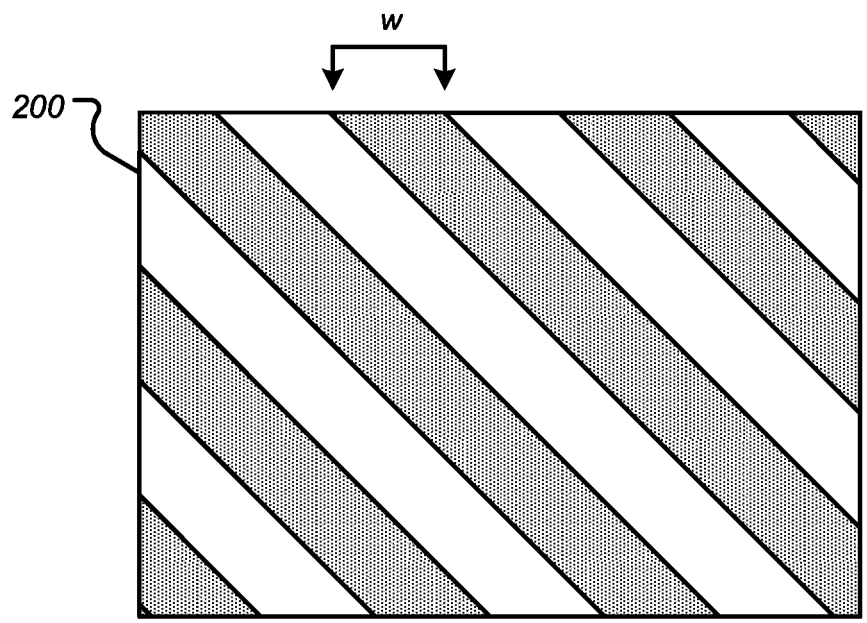
FIGS. 2A-2C illustrate exemplary encoding patterns of an optical encoder according to one or more embodiments of the present disclosure.
Figure 2B:
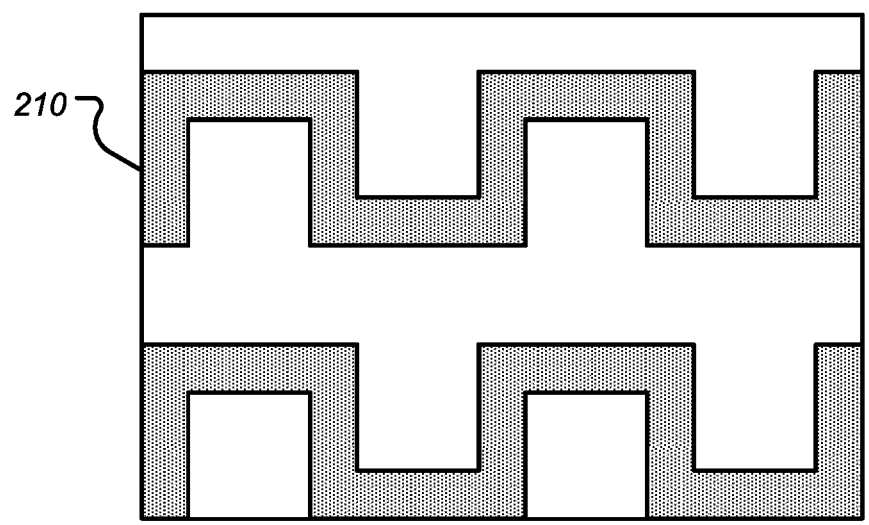
Figure 2C:
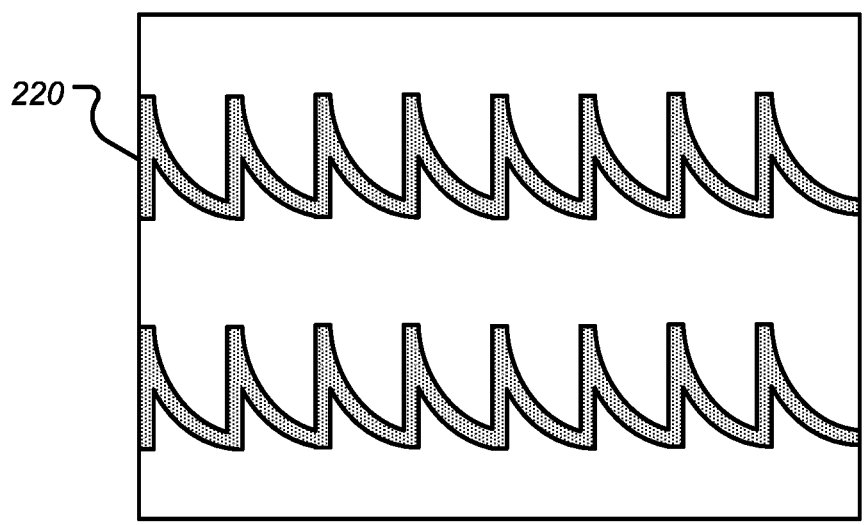

In certain embodiments, the encoding pattern 165 may have an axial component and a radial component. For example, the encoding pattern 165 may include light and dark stripes arranged in an angled configuration 200 such as shown in FIG. 2A, a square wave configuration 210 such as shown in FIG. 2B, a saw-tooth configuration 220 such as shown in FIG. 2C and so on. Although specific shapes and patterns are mentioned, the encoding pattern 165 may also be arranged in a sine wave and various other patterns having both an axial component and a radial component.

Further, although light stripes and dark stripes are specifically mentioned and shown in the figures, the encoding pattern 165 may consist of various types of stripes having various shades or colors that provide surface contrasts. For example, the encoding pattern may include a stripe or marking that has a high reflective surface and another stripe that has a low reflective surface regardless of the color or shading of the stripes or markings. In another embodiment, a first stripe or portion of the first stripe of the encoding pattern may cause specular reflection while a second stripe or a portion of the second stripe of the encoding pattern 165 may cause diffuse reflection. When the reflected light is received by the photodiode array 180, a determination may be made as to the position and movement of the shaft such as described below. In embodiments where a holographic or diffractive pattern is used, the light from the light source will diffract from the shaft. Based on the diffracted light, the photodiode array 180 may determine the position, movement and direction of movement and type of the shaft.

The stripes of the encoding pattern 165 may extend both axially and radially along the shaft 160. The stripes may extend along the entire length of the shaft 160 or partially along a length of the shaft. In addition, the encoding pattern 165 may also be disposed around the entire circumference of the shaft 160. In other embodiments, the encoding pattern may include a radial component. In yet other embodiments, the encoding pattern may have both a radial component and an axial component. For example, the encoding pattern may extend axially along the shaft 160 for a first distance, then extend radially across the shaft 160 for a second distance, extend axially along the shaft 160 for a third distance and so on. The first, second and third distances may all be different distances, similar distances or substantially similar distances. Further, each of the first, second and third distances may have the same width or different widths.

In another embodiment, the encoding pattern 165 may be disposed only on certain areas of the shaft 160. For example, if a shaft 160 was configured to have partial rotational movement about an axis in a given direction (instead of full rotational movement about the axis such as described herein), the encoding pattern 165 may only be disposed on a portion of the shaft 160 that would be visible to the photodiode array 180 as the shaft 160 is moved in a rotational direction and/or a translational direction.

The light and dark stripes of the encoding pattern 165 may alternate between a light stripe and a dark stripe. In another embodiment, the light stripes and the dark stripes of the encoding pattern 165 may be arranged in a particular pattern or order. In such embodiments, each section of the pattern may indicate a position of the shaft 160.

In another example, the stripes of the encoding pattern 165 may have varying widths. The varying widths of each stripe may provide a pattern that indicates a position of the shaft 160. For example, a stripe having a first width may indicate that the shaft 160 is in a first position while a stripe having a second width may indicate the shaft 160 is in a second position. In still yet another example, the different widths of each of the strips may be used to determine linear movement of the shaft 160 as well as rotational movement of the shaft 160.

The stripes of the encoding pattern 200 may also be arranged in different patterns. For example, the stripes of the encoding pattern 200 may arranged in a QR code, a bar code or other such pattern that may be used to determine a rotational, translational, or angular movement of the shaft 160 as well as the movement speed of the shaft 160.

Referring back to FIG. 1B, the optical encoder of the present disclosure also includes a photodiode array 180. The photodiode array 180 may be separated into a number of quadrants or otherwise divided into various sections. Each quadrant of the photodiode array 180 is configured to receive light that is reflected off of the shaft 160. Specifically, the photodiode array 180 is configured to receive light of different intensity values based on whether the light has been reflected off of the encoding pattern and in a direction toward to photodiode array in a diffusive manner, in a specular manner or a combination thereof. The intensity values of the light that is received may then be compared with an intensity value of light received at a previous time to determine movement direction, speed and the like.

For example, the photodiode array 180 may receive light that is reflected off of the encoding pattern 165. Specifically, as light from the light source 170 hits the various stripes of the encoding pattern 165, the light is reflected off of the light stripes in a specular manner and is reflected off of the dark stripes in a diffusive manner. The various intensities of the reflected light are then received by the photodiode array 180 which then converts the reflected light into an output current.

Thus, the higher the output current from the photodiode, the more the light stripe, or the reflective stripe, is seen by the quadrants in the photodiode array 180 (or seen by a particular photodiode of the photodiode array 180). Likewise, the smaller the output current, the more the dark stripe, or non-reflective surface, is seen by the photodiode array 180 (or seen by a particular photodiode or quadrant of the photodiode array 180).

Based on the above, rotational and translational movement of the shaft 160 and ultimately the crown 140 may be determined. For example, rotational data may be derived from analyzing the outputs of the photodiodes in the photodiode array 180 across various sample frames. The variance of the outputs in a given time between the sample frames is related to the motion or rotational direction of the stripes of the encoding pattern 165 and ultimately the shaft 160.

Figure 3:
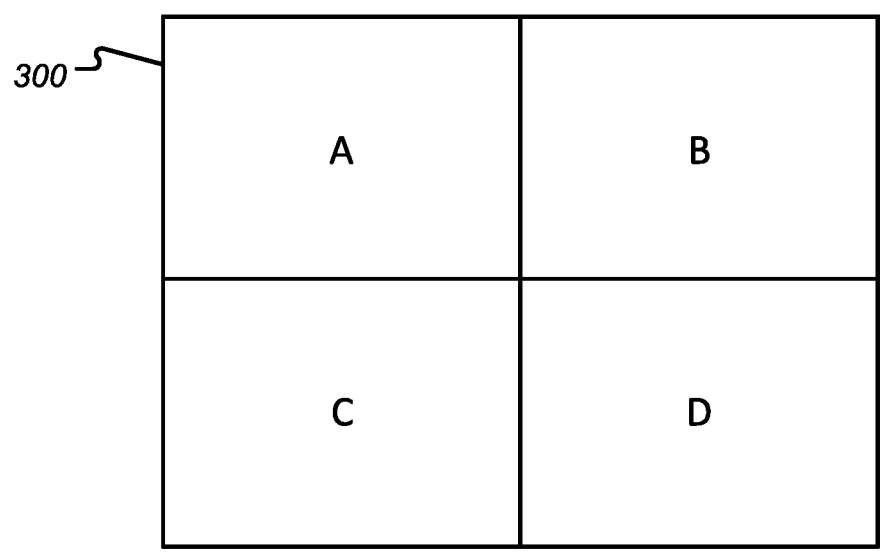
FIG. 3 illustrates an exemplary segmented photodiode array according to one or more embodiments of the present disclosure.

Referring to FIG. 3, FIG. 3 illustrates an exemplary segmented photodiode array 300 according to embodiments of the present disclosure. The photodiode array 300 may be similar to the photodiode arrays disclosed herein. For example, photodiode array 300 may be similar to photodiode array 180 described above with respect to FIG. 1B and FIG. 1C or may be similar to photodiode array 530 described below with respect to FIG. 5A and FIG. 5B.

As shown in FIG. 3, the photodiode array 300 may be segmented into various quadrants such, as, for example, quadrant A, quadrant B, quadrant C and quadrant D. Although the photodiode array 300 is shown in various segments, the photodiode array 300 may be arranged in any two dimensional pattern (either segmented or not) that may receive light reflected off of an optical encoder as the optical encoder moves in a translational manner and a rotational manner.

Light from the light source is reflected off of an encoding pattern and received by each quadrant. Values of current received by each quadrant may then be combined and analyzed to determine translational and/or rotational movement of an encoding pattern. Specifically, a change in current values between pairs of quadrants may be compared against previously received values to determine the movement.

For example, current values received in quadrant A and quadrant B (either separately or combined) may be compared with current values received in quadrant C and quadrant D (either separately or combined) over a time period t to detect translational movement of a shaft of an encoder. Likewise, current values received in quadrant A and quadrant C may be compared with current values received in quadrant B and quadrant D over a time period t to detect rotational movement of the shaft of the encoder.

In embodiments, the values received in each quadrant may be compared simultaneously or substantially simultaneously. For example, a determination of translational movement may be determined simultaneously or substantially simultaneously with a determination of rotational movement and vice versa based on output from the photodiode array 300.

In some embodiments, an update to a display may only occur if translational or rotational movement exceeds a threshold. For example, if the photodiode array 300 detects movement in both a translational direction and in a rotational direction simultaneously or substantially simultaneously, a display will be updated only if the movement of the shaft exceeds a given threshold. In another example, a display may only be updated if a change in current output provided by the photodiode array 300 exceeds a particular threshold.

Figure 4A:
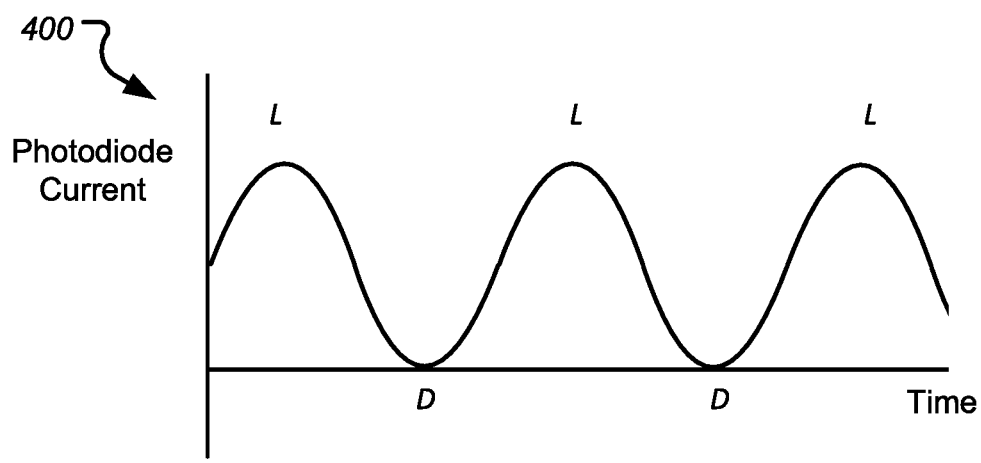
FIGS. 4A-4C illustrate exemplary current output graphs of a photodiode array according to embodiments of the present disclosure.
Figure 4B:
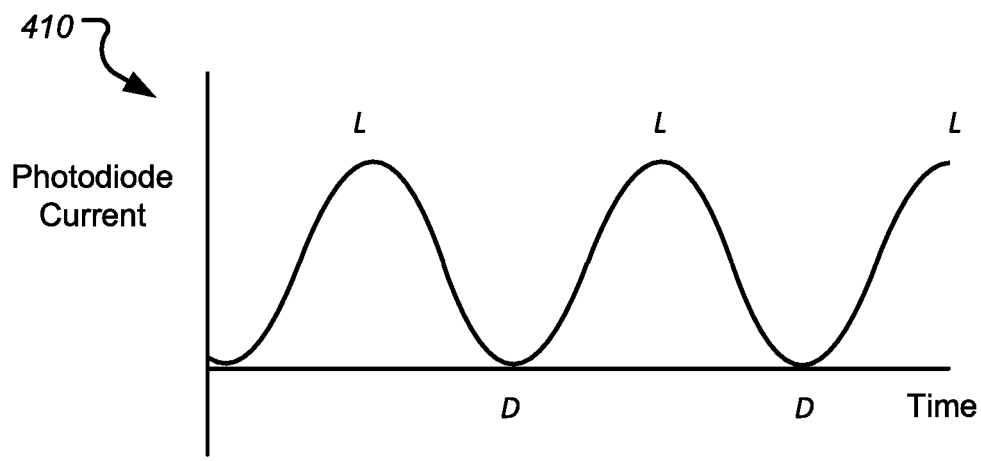
Figure 4C:
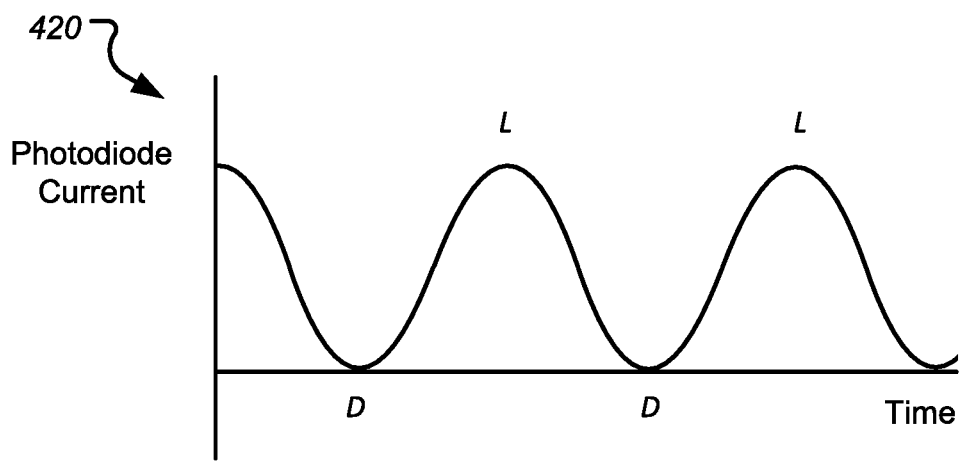

Referring to FIG. 4A-FIG. 4C, FIG. 4A-FIG. 4C show exemplary current output graphs provided by a photodiode array. For example, each graph 400, 410, and 420 represent output provided by a photodiode array as it receives light that is reflected off of an encoding pattern. As discussed above, the sensor that is used to detect movement of the shaft of the optical encoder may be any type of sensor. Thus, the output shown in FIGS. 4A-4C are but one example of output provided by a sensor.

For example, the graph 400 shown in FIG. 4A may represent output of a photodiode array over a time t. In a subsequent time period, the output of the photodiode array may look like the output provided by graph 410 of FIG. 4B. When compared with the output of the graph 400 of FIG. 4A, it can be determined that the shaft of the encoder is rotating in a particular direction or that the shaft of the encoder has moved in a translational direction (e.g., pushed inward). Similarly, when the output of graph 420 shown in FIG. 4C is compared with the output of graph 400, it can be determined that the shaft of the encoder is rotating in another direction or is moving in another translational direction (e.g., pulled outward). More specifically, as the photodiodes in the photodiode array take multiple sequential samples and compare the samples with at least one previous sample, rotational and translational movement is able to be determined based on the current output of the photodiode array.

In addition to the rotational information, the current output from the photodiode array may be used to determine a speed at which the shaft is rotating or moving. In embodiments, the speed of the movement of the shaft is determined based on how quickly the pattern of reflected light changes. Once the movement direction and speed are determined, output on a display of the electronic device may be adjusted accordingly. In addition, the output provided by the photodiode array may be used to detect the angular rotation of the shaft in a similar manner.

Referring back to FIG. 1B, the light source 170 of the electronic device 100 may be any type of emitter that provides a light that can be reflected off of the shaft 160 to be received by the photodiode array 180. For example, the light source 170 may be an LED, an infrared light such as, for example an infrared LED, a linear light source, a laser diode, a light bulb and the like.

In embodiments when the light source 170 is an infrared light source, the encoding pattern 165 disposed on the shaft 160 may be invisible to the human eye but the overall movement determination may operate as described above. For example, a first set of stripes of the encoding pattern 165 may be IR-absorptive and a second set of stripes of the encoding pattern 165 may be IR-reflective. The photodiode array may receive the IR-reflective light when the IR-reflective stripe is shown and less light as the shaft turns. Accordingly, a determination of rotational movement may be made as described above.

In embodiments, the light source 170 and the photodiode 180 are axially aligned with respect to the shaft 160. In another embodiment, the light source 170 and the photodiode 180 may be radially aligned with respect to the shaft 160. Although specific alignments are disclosed, in certain embodiments the light source 170 and the photodiode array 180 may be aligned with the shaft 160 in any suitable manner so long as light is emitted from the light source 170 is reflected off of the encoding pattern 165 on the shaft 160 and received by the photodiode array 180.

Depending on the use of the shaft 160, the length of the shaft 160 may vary between embodiments. For example, in some embodiments, the length of the shaft 160 may extend along a length or width of the housing 110. In another embodiment, the shaft 160 may have a length that is substantially less than a length or width of the housing 110.

In addition to the above, the distance in a z direction between the shaft 160 and the light source 170 and the photodiode array 180 may also vary. Generally, it should be noted that, as the z distance between the shaft 160 and the light source 170 and the photodiode 180 increases, the pattern of light reflected off of the shaft 160 increases in size. Specifically, the number of samples in a given time frame decreases. Likewise, as the z distance between the shaft 160 and the light source 170 and the photodiode array 180 decreases, the pattern of light reflected off of the shaft 160 decreases in size. More specifically, the number of samples in a given time frame increases. As the number of samples increase, the rotational direction and the rotation speed of the shaft may be better determined.

FIG. 1C illustrates a cross-sectional view of the electronic device 100 according to another embodiment of the present disclosure. As shown in FIG. 1C, the electronic device 100 includes similar components to those described above with respect to FIG. 1B. For example, the electronic device 100 includes an optical encoder that consists of a shaft 160, a light source 170 and a photodiode array 180. The shaft 160 includes an encoding pattern 165 that has both axial components and radial components. Further the optical encoder may be used to detect rotational movement and translational movement (as shown by arrow 185).

In addition to the components described above with respect to FIG. 1B, the electronic device 100 shown in FIG. 1C includes a sealing portion 190 and a button 195. Referring to the sealing portion 190, the sealing portion 190 may be used to protect the encoder wheel from outside elements that may cause damage or otherwise corrode the encoding pattern 165 or the shaft 160. In embodiments, the sealing portion 190 may be used to fully seal all of the components of the optical encoder including the photodiode array 180 and the light source 170.

The sealing portion 190 may be made of glass, plastic, sapphire or other transmissive material. In embodiments, only the portion of the sealing portion 190 through which light from the light source 170 passes is transmissive. In other embodiments, all, or substantially all of the sealing portion 190 may be made from the same material. Further, the sealing portion 190 may be rounded, rectilinear, square and so on.

In embodiments, the space between the sealing portion 190 and the rest of the components of the optical encoder may be filled with air, inert gas, a liquid (e.g., an oil lubricant) or may be a vacuum space. Use of such materials may prevent or help to prevent rust and/or reduce wear and tear on the various components of the optical sensor.

The sealing portion 190 may also include a button 195. In embodiments, the button 195 may be a mechanical tac switch that creates a switch click but contains no electronics. Thus, when a user pushes on the crown 140 of the electronic device, the user feels actuation of a button. However, translational movement of the optical encoder such as described above, provides the data regarding the "button press." In other embodiments, button 195 may include all electronics of a button and provide signals when actuated.

Figure 5A:
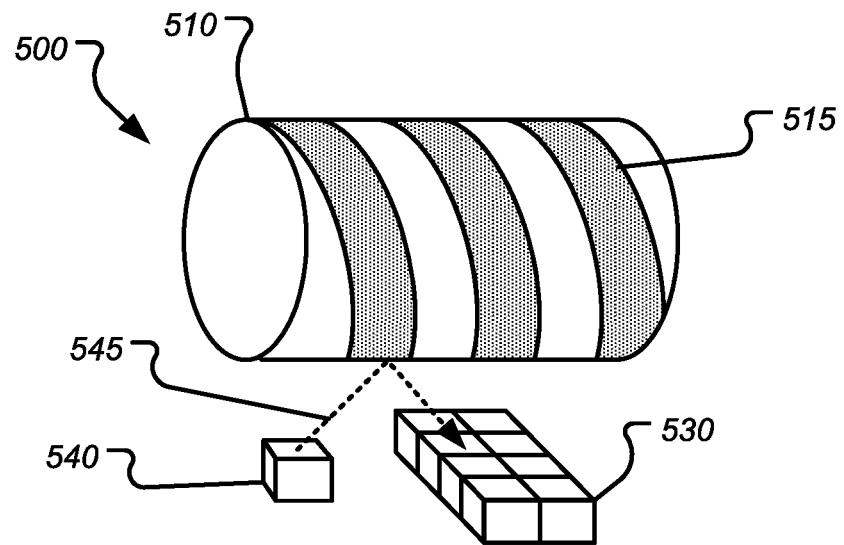
FIGS. 5A-5B illustrate an optical encoder having components of an optical sensor according to one or more embodiments of the present disclosure.
Figure 5B:
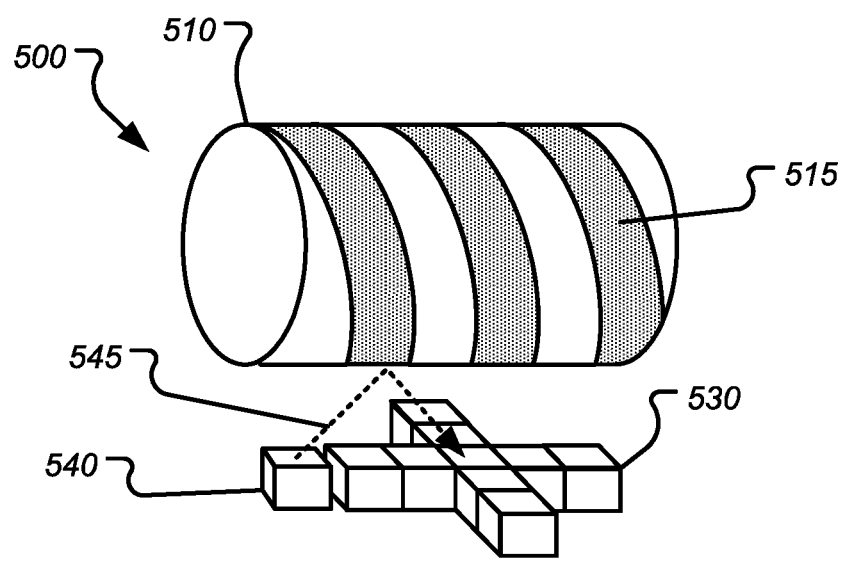

FIG. 5A-FIG. 5B illustrate an optical encoder 500 according to one or more embodiments of the present disclosure. In embodiments, the optical encoder 500 may be similar to the optical encoder shown and described with respect to FIG. 1B and FIG. 1C.

As shown in FIG. 5A, the optical encoder 500 includes a shaft 510, a light source 540 and a photodiode array 530. The shaft 510 includes an encoding pattern 515. The encoding pattern 515 may include a plurality of different colored stripes or shaded stripes that have an axial component and a radial component. For example, as shown in FIG. 5A, the stripes of the encoding pattern 515 may wrap around a circumference of the shaft 510 along a length of the shaft 510.

In other embodiments, the stripes of the encoding pattern may alternate in color, width, length and the like. For example, a first stripe of the encoding pattern 515 may be in a first color, a second stripe of the encoding pattern 515 may be in a second color and a third stripe of the encoding pattern 515 may be in a third color. As different colors may be used, the photodiode array 550 may be color-sensitive. Accordingly the change in color in the encoding pattern 515 as the shaft rotates about it axis may be used to determine rotational and translational movement of the shaft 510 as well as movement speed of the shaft 510.

In certain embodiments, the stripes of the encoding pattern 515 may be configured to cause specular reflection and diffuse reflection. For example, the light 545 from the light source 540 may be reflected in either or both of a specular manner or in a diffusive manner from the shaft to the photodiode array 530. When the light 545 is received by the photodiode array, a current, based on the intensity of the light, is used to determine a current position of the shaft. When the shaft is moved, the change in light intensity or current that is output from the photodiode array is used to determine translational and/or rotational movement of the shaft 510 such as described above.

Although embodiments shown and described discuss the use of both light and dark stripes in the encoding pattern, in certain embodiments, the entire shaft 510 may be specular (e.g., the entire shaft 510 enables specular reflection). In such embodiments, the shaft 510 may have one or more striations, flutes, channels and the like.

For example, a shaft of an optical encoder may include a plurality of surface forms, such as, for example one or more flutes, channels and the like. The surface forms may include be axially aligned with respect to the shaft, radially aligned with respect to the shaft or a combination thereof. These surface forms may cause light to be reflected from the shaft even if there is no variation in color or reflectance from the shaft. In embodiments, the surface forms may be added to the shaft during the manufacturing process or may be a natural byproduct (or otherwise present) in the shaft due to a machining process.

In embodiments where the surface forms are present, the shape of the one or more surface forms in the shaft may cause the light from a light source to be reflected from the shaft in many different angles and be received by a photodiode array thereby simulating diffusion. In such embodiments, the surface forms may vary in size or have the same or substantially the same size. In other embodiments, the shaft may include surface forms as well as one or more light and/or dark stripes of an encoding pattern such as described above. As such, both features may then be used in conjunction to determine rotational and/or linear movement and speed such as described above.

Referring back to FIG. 5A, the optical encoder 500 may include a light source 540 and a photodiode array 530. In embodiments, the light source 540 may be axially aligned or radially aligned with the photodiode array 530 or with the shaft 510.

The photodiode array 530 may be segmented into quadrants such as described above. In another embodiment, the photodiode array 530 may be a two dimensional array having a n rows and m columns. For example as shown in FIG. 5A, the photodiode array 530 may be a four by two photodiode array. However, the number of photodiodes in the two dimensional photodiode array may increase or decrease depending on the size of the collection area of each of the photodiodes. For example, an accurate rotational or linear movement of the shaft 510 may be collected from an array of two photodiodes. In other embodiments, eight or more photodiodes may be required. In another embodiment, multiple arrays of photodiodes may be used. Further, each of photodiode arrays may be arranged in various alignments and positions with respect to the shaft 510.

In another embodiment, the photodiode array 530 may be arranged such as shown in FIG. 5B. As shown, at least one portion of the photodiode array is axially aligned with the respect to the shaft 510 or more specifically, at least one stripe of the optical encoder is axially aligned with respect to the photodiode array 530. In such arrangement, a first portion of the photodiode array 530 may be used to determine rotational movement while a second portion of the photodiode array may be used to determine translational movement.

In yet another embodiment, a portion of the photodiode array 530 may be offset from the encoder in a push or a pull direction. Thus, any change in light intensity received by the offset portion of the photodiode array would indicate translational actuation of the shaft 510.

Figure 6:
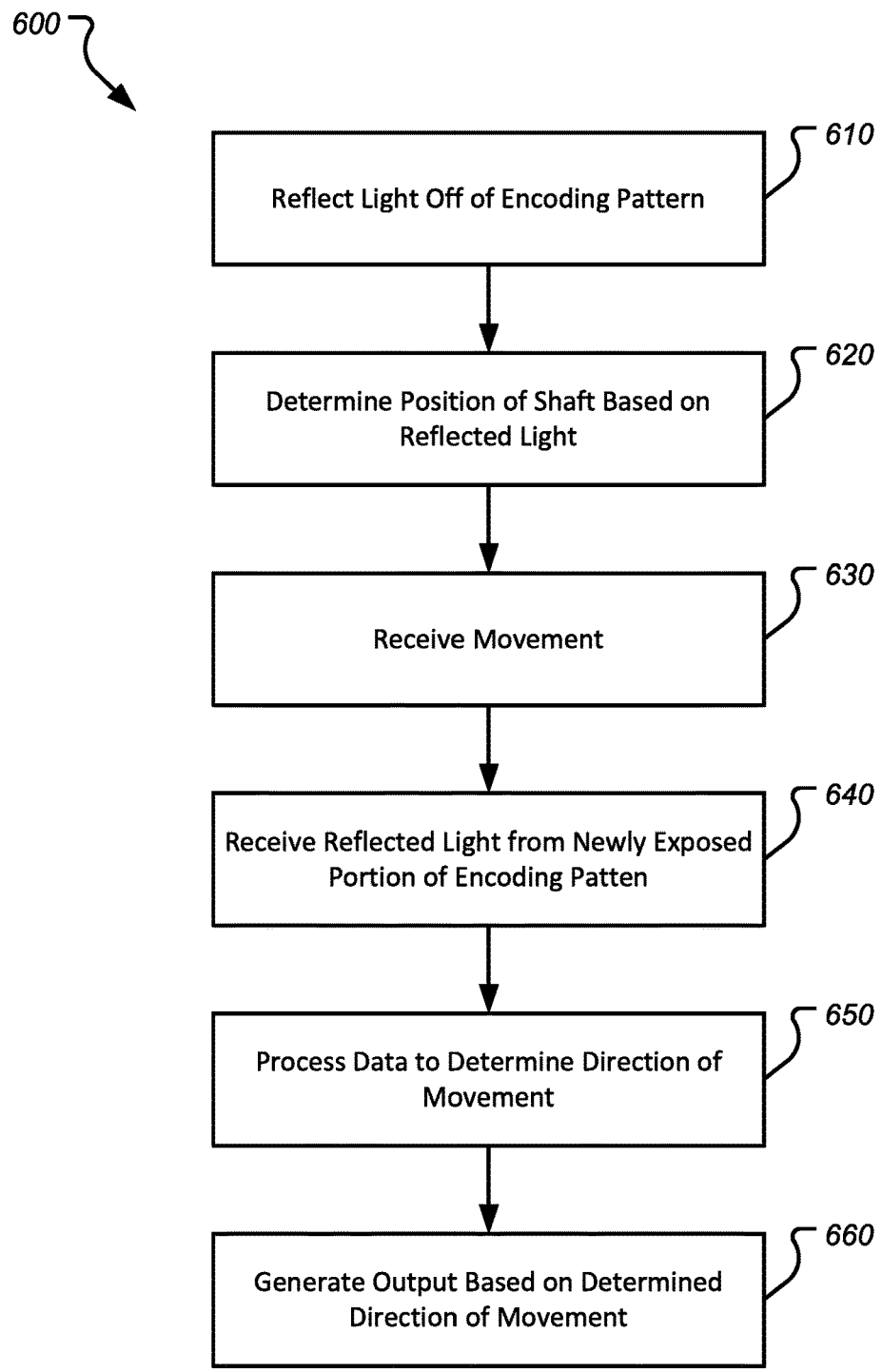
FIG. 6 illustrates a method for detecting movement of a component of an electronic device according to one or more embodiments of the present disclosure.

FIG. 6 illustrates a method 600 for collecting and determining movement of a shaft of an optical encoder according to one or more embodiments of the present disclosure. In embodiments, the method 600 may be used to determine rotational movement of the shaft, angular movement of the shaft, translational movement of the shaft as well as a speed of movement of the shaft. Further, the method 600 described below may be used with the embodiments shown and described above with respect to FIG. 1A through FIG. 5B.

The method 600 begins by causing light from a light source to be reflected off of an encoding pattern that is disposed on a shaft of an optical encoder. The encoding pattern disposed on the shaft may include a plurality of light and dark stripes that have one or both of an axial component and a radial component.

In another embodiment, the shaft of the optical encoder may include one or more surface components. In such embodiments, the surface components may be used to reflect light in a variety of different directions. The surface components may be used in conjunction with the light and dark markings of the encoding pattern. In alternative embodiments, the surface components may be used without the need of either one or both of the light markings of the encoding pattern or the dark markings of the encoding pattern.

In operation 620, the light that is reflected off of the encoding pattern is received by a photodiode array. More specifically, light that is reflected off of the encoding pattern is received by various quadrants of the photodiode array. When the photodiode array receives the reflected light, an initial position of the shaft may be determined. Specifically, as light is reflected from the encoding pattern and received by the quadrants of the photodiode array, pairs of quadrants of the photodiode array output a current which represents the amount of light and dark stripes that are in view of the respective quadrants of the photodiode array. This output current may then be used to represent a position of the shaft at a time t.

Flow then proceeds to operation 630 in which movement of the shaft is received. In embodiment, the movement may be rotational movement, translational movement, angular movement or combinations thereof. For example a crown of an electronic device may be rotated to change an output on a display such as described above. In another embodiment, the crown may be pushed inward or pulled outward.

Flow then proceeds to operation 640 in which light from the newly exposed portion of the encoding pattern is received by the quadrants of the photodiode array. When the newly reflected light is received, the quadrants of the photodiode array output a current based on the intensity of the reflected light.

Once the reflected light from the newly exposed encoding pattern is received, operation 650 provides that the data output by the quadrants of the photodiode array is analyzed to determine a direction of movement of the shaft. In embodiments, the speed of the movement of the shaft may also be determined.

Specifically, operation 650 provides that data output by specific quadrants of the photodiode array from operation 620 above may be compared against data output by the photodiode array from operation 640. For example, the comparison of light intensity received by quadrants A and B (FIG. 3) versus the light intensity received by quadrants C and D at a first time is compared with light intensity received by quadrants A and B versus quadrants C and D at a second time to determine whether any translational movement occurred. Likewise, the comparison of light intensity received by quadrants A and C (FIG. 3) versus light intensity received by quadrants B and D at a first time is compared against light intensity received by quadrants A and C versus light intensity received by quadrants B and D at a second time to determine if rotational movement has occurred.

Further, operation 650 may be used to determine a speed of rotation of the shaft. For example, as the photodiode array outputs the detected change in current, the speed of the change may also be monitored. The change in speed may then be used to determine the overall speed of the movement of the shaft.

In operation 660, output is generated based on the determined direction of the movement of the shaft. For example, as a crown of an electronic device is rotated or otherwise moves, one or more icons or images a display of the electronic device may need to be updated accordingly. For example, if the display of the electronic device is displaying a time keeping application, the crown of the electronic device may be rotated in either direction to change or adjust the position of the hands that are displayed by the time keeping application. Specifically, the hands that are displayed by the time keeping application may move in the direction and speed indicated by the determined movement and speed of the shaft such as described above. If translational movement is determined, a specific functionality (e.g., selection of an icon) may be performed.

Although embodiments have been described above with respect to a rotational and translational movement of a shaft of an electronic device, embodiments of the present disclosure are not so limited. For example, the crown of the electronic device shown with respect to FIG. 1A could be replaced by a keycap for a keyboard. Thus, each key of the keyboard may be optically encoded for translational movement or other types of movement. In other embodiments, the optical encoder disclosed herein could be used with a button a sliding switch and the like.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:

1. A wearable device, comprising:

a housing;

a display mounted to the housing and viewable by a user;

a shaft extending through the housing and having a set of surface forms thereon, the set of surface forms being a byproduct of forming the shaft;

a crown attached to an end of the shaft and operable by the user to rotate the shaft about an axis of the shaft;

a light emitter disposed at a first position along, and spaced apart from, the shaft, the light emitter configured to emit light toward and along the shaft;

an array of photodiodes disposed at a second position along, and spaced apart from, the shaft, the array of photodiodes comprising different photodiodes that extend along an axial dimension of the shaft and different photodiodes that extend across a radial dimension of the shaft;

a processor configured to analyze changes in an output of the array of photodiodes, and to determine a direction of rotation of the shaft; wherein:

the light emitted by the light emitter is diffusely reflected by the set of surface forms and received by the array of photodiodes; and a change in the diffusely reflected light due to rotation of the shaft produces a corresponding change in the output of the array of photodiodes.

2. The wearable device of claim 1, wherein the light emitter and the array of photodiodes are aligned along a second axis parallel to the axis of the shaft.

3. The wearable device of claim 1, wherein the output of the array of photodiodes is a current generated by at least a portion of the array of photodiodes.

4. The wearable device of claim 1, wherein:

the housing forms at least part of a sealed cavity disposed around the shaft; and the crown is exterior to the sealed cavity.

5. The wearable device of claim 1, wherein:

the array of photodiodes is configured in four quadrants;

a first quadrant and a second quadrant are axially aligned with respect to the axis of the shaft; and a third quadrant and a fourth quadrant are axially aligned with respect to the axis of the shaft, and not axially aligned with the first quadrant and the second quadrant.

6. The wearable device of claim 5, wherein the change in the output of the array of photodiodes due to rotation of the shaft comprises at least one of: a change in current values generated by the first quadrant or the second quadrant, or a change in current values generated by the third quadrant or the fourth quadrant.

7. The wearable device of claim 5, wherein the processor is further configured to determine a speed of the rotation of the shaft using the change in the output of the array of photodiodes.

8. The wearable device of claim 1, wherein the processor is further configured to adjust an image on the display based on the direction of rotation of the shaft.

9. The wearable device of claim 1, further comprising a plurality of markings alternating axially along the shaft between a light marking and a dark marking.

10. The wearable device of claim 9, wherein a change in the diffusely reflected light due to a translational movement of the shaft produces a change in the output of the array of photodiodes.

11. An electronic device, comprising:

a housing;

a shaft extending through the housing and having a set of surface forms thereon, the set of surface forms being a byproduct of forming the shaft;

a crown attached to an end of the shaft and operable by a user to rotate the shaft about an axis of the shaft;

a light emitter disposed at a first position adjacent to the shaft and configured to emit light toward and axially along the shaft;

an array of photodiodes positioned adjacent to the shaft and arranged in four quadrants, the array of photodiodes comprising different photodiodes that extend along an axial dimension of the shaft and different photodiodes that extend across a radial dimension of the shaft; and a processor configured to analyze changes in respective outputs of each of the four quadrants of the array of photodiodes, and to determine a direction of rotation of the shaft based on the changes; wherein:
the light emitted by the light emitter is diffusely reflected by the set of surface forms and received by the array of photodiodes; and
changes in the diffusely reflected light due to rotation of the shaft produce a change in the respective output of at least one quadrant of the four quadrants.

12. The electronic device of claim 11, wherein the processor is further configured to determine a speed of the rotation of the shaft based on the changes in the respective outputs.

13. The electronic device of claim 11, wherein the respective outputs of the four quadrants are respective currents generated by the photodiodes in the four quadrants.

14. The electronic device of claim 11, wherein:
a first quadrant and a second quadrant are axially aligned with respect to the axis of the shaft; and
a third quadrant and a fourth quadrant are axially aligned with respect to the axis of the shaft.

15. The electronic device of claim 14, wherein the change in the respective output of at least one quadrant comprises at least one of: a change in at least one current of the first quadrant or the second quadrant; or a change in at least one current of the third quadrant or the fourth quadrant.

16. The electronic device of claim 15, further comprising a plurality of markings alternating axially along the shaft between a light marking and a dark marking, wherein a change in the diffusely reflected light due to translational movement of the shaft produces a change in the output of the array of photodiodes.

17. The electronic device of claim 16, wherein the change in the output of the array of photodiodes due to the change in the diffusely reflected light comprises at least one of: a change in at least one current of the first quadrant or the third quadrant; or a change in at least one current of the second quadrant or the fourth quadrant.

18. A method for detecting rotational movement of a shaft contained within an electronic device, comprising:
emitting light from a light source axially along the shaft, the light source being positioned adjacent to the shaft;
receiving, on a photodiode array, light reflected from surface forms on the shaft, wherein:
the surface forms are a byproduct of forming the shaft; and
photodiodes in the photodiode array are arranged in four quadrants, the photodiode array comprising different photodiodes that extend along an axial dimension of the shaft and different photodiodes that extend across a radial dimension of the shaft;
receiving, at a processor, respective signals related to outputs from each of the four quadrants; and
analyzing, by the processor, changes in the respective signals to determine a direction of rotation of the shaft; wherein:
the light reflected from the surface forms is diffusely reflected light.

19. The method of claim 18, further comprising:
determining a speed of the rotation of the shaft based on the changes in the respective signals.

20. The method of claim 18, wherein the respective signals correspond to currents generated by the four quadrants.

* * * * *